(12) United States Patent
Schwalbe et al.

(10) Patent No.: US 9,124,445 B2
(45) Date of Patent: Sep. 1, 2015

(54) APPARATUS FOR INTEGRATING DEVICE OBJECTS INTO A SUPERORDINATED CONTROL UNIT

(75) Inventors: Alexander Schwalbe, Pforzheim (DE); Thomas Bednasch, Mannheim (DE)

(73) Assignee: CODEWRIGHTS GMBH, Karlsruhe (DE)

(*) Notice: Subject to any disclaimer, the term of this patent is extended or adjusted under 35 U.S.C. 154(b) by 1391 days.

(21) Appl. No.: 12/457,404

(22) Filed: Jun. 10, 2009

(65) Prior Publication Data

US 2009/0319061 A1 Dec. 24, 2009

(30) Foreign Application Priority Data

Jun. 12, 2008 (DE) .......................... 10 2008 027 935

(51) Int. Cl.
| | |
|---|---|
| G06F 3/00 | (2006.01) |
| H04L 12/40 | (2006.01) |
| G05B 19/05 | (2006.01) |
| H04L 29/08 | (2006.01) |
| H04L 29/06 | (2006.01) |

(52) U.S. Cl.
CPC ........ *H04L 12/40006* (2013.01); *G05B 19/056* (2013.01); *H04L 67/125* (2013.01); *H04L 69/08* (2013.01); *H04L 2012/4026* (2013.01)

(58) Field of Classification Search
USPC .......................................................... 710/8
See application file for complete search history.

(56) References Cited

U.S. PATENT DOCUMENTS

| | | | | |
|---|---|---|---|---|
| 7,623,479 | B2* | 11/2009 | Tapperson et al. | 370/310 |
| 2002/0173860 | A1* | 11/2002 | Bruce et al. | 700/17 |
| 2003/0084047 | A1* | 5/2003 | Williamson | 707/10 |
| 2004/0015952 | A1 | 1/2004 | Lajoie et al. | |
| 2004/0260431 | A1* | 12/2004 | Keenan et al. | 700/295 |
| 2005/0066104 | A1* | 3/2005 | Train et al. | 710/305 |
| 2008/0294915 | A1* | 11/2008 | Juillerat et al. | 713/300 |
| 2009/0006831 | A1* | 1/2009 | Kwong et al. | 713/1 |
| 2009/0168857 | A1* | 7/2009 | Golborne et al. | 375/223 |

FOREIGN PATENT DOCUMENTS

| | | | |
|---|---|---|---|
| DE | 10313389 | A1 | 10/2004 |
| DE | 102006055900 | A1 | 6/2007 |

* cited by examiner

*Primary Examiner* — Elias Mamo
(74) *Attorney, Agent, or Firm* — Bacon & Thomas, PLLC

(57) ABSTRACT

An apparatus for integrating device objects into a superordinated control unit for field devices in automation technology. A predetermined operating system runs on the control unit, and the control unit communicates via a fieldbus with the field devices. A communication hardware is provided, having a first communication link for connecting to the control unit and a second communication link for connecting to the fieldbus. Associated with the communication hardware is a memory element. The communication hardware is so embodied, that, upon coupling of the communication hardware to the control unit via the first communication link, the frame application is started via the operating system of the control unit and the driver for the communication hardware is installed, so that operating personnel can, via the device objects stored in the memory element and the fieldbus, service the associated field devices.

11 Claims, 3 Drawing Sheets

APPARATUS FOR INTEGRATING DEVICE OBJECTS INTO A SUPERORDINATED CONTROL UNIT

TECHNICAL FIELD

The invention relates to an apparatus for integrating device objects into a superordinated control unit for field devices in automation technology, wherein a predetermined operating system runs on the control unit, the control unit communicates with the field devices via a fieldbus, and the device objects serve for servicing the field devices.

BACKGROUND DISCUSSION

In process automation technology, as well as in manufacturing automation technology, field devices are often applied for registering and/or influencing process variables. Serving for registering process variables are measuring devices, such as, for example, fill level measuring devices, flow measuring devices, pressure and temperature, measuring devices, pH-measuring devices, conductivity measuring devices, etc., which register the corresponding process variables, fill level, flow, pressure, temperature, pH-value, and conductivity, respectively. Used for influencing process variables are actuators, such as valves or pumps, via which e.g. flow of a liquid in a pipeline or fill level of a medium in a container is changed. Referred to as field devices are, in principle, all devices, which are applied near to the process and deliver, or process, process-relevant information. A large number of such field devices are available from the firm, Endress+Hauser. In connection with the invention, the term "field devices" refers, thus, to all types of measuring devices and actuators.

In modern industrial plants, field devices are, as a rule, connected via bus systems, such as, for example, a Profibus® PA, Foundation Fieldbus® or HART® bus system, with at least one superordinated control unit. The superordinated control unit can also be referred to as an object-based, management and/or configuration system for field devices. The control unit is, for example, a control system or a control unit, such as, for example, a programmable logic controller, or PLC. The PLC can be integrated, for example, into a personal computer or into a laptop. The term "device objects" refers, in connection with the present invention, to all types of electronic device descriptions. The superordinated control unit serves for process control, for process visualizing, for process monitoring, as well as for start-up and servicing of the field devices. Programs, which run self-sufficiently on superordinated units, include, for example, the operating, or servicing, tools, FieldCare of Endress+Hauser, Pactware, AMS of Fisher-Rosemount or PDM of Siemens. Operating tools, which are integrated into control system applications, include PCS7 of Siemens, Symphony of ABB and Delta V of Emerson. The terminology, "servicing of field devices", means, especially, the configuring and parametering of field devices, however, also diagnosis for the purpose of early detecting of defects at one of the field devices or in the process.

The integration of field devices into object-based, configuration or management systems occurs via device descriptions, which care therefor, that the superordinated units can recognize and interpret the data delivered by the field devices. The device manufacturers provide device descriptions for each field device type, or for each field device type as a function of application. In order that the field devices can be integrated into different fieldbus systems, different device descriptions for the different fieldbus systems must be created. Thus, there are, to name just a few examples, HART, Fieldbus Foundation and Profibus, device descriptions.

For the purpose of creating a uniform description for field devices, Fieldbus Foundation (FF), HART Communication Foundation (HCF) and Profibus Nutzer(user)organisation (PNO) have created a uniform, electronic device description (Electronic Device Description, or EDD). The EDD is defined in the standard IEC 61804-2.

For a comprehensive servicing of field devices, moreover, particular device descriptions, so called DTMs—Device Type Managers or device managers—are obtainable. The DTMs meet the FDT—Field Device Tool—specifications. The FDT specification, representing an industrial standard, is an interface specification and was developed by the PNO, in cooperation with the ZVEI—Zentralverband Elektrotechnik- und Elektroindustrie (German Electrical and Electronics Manufacturers' Association). Current FDT specifications are obtainable from ZVEI, PNO, or the FDT Group.

Many field device manufacturers deliver along with their field devices the corresponding DTMs or device descriptions. The DTMs encapsulate all device-specific data, functions and operating rules, such as e.g. the device structure, present communication possibilities and the graphical user interface, e.g the GUI, for a certain field device or for a particular field device type.

As runtime environment, the DTMs require a frame application—here, the FDT-frame. The frame application and the corresponding DTMs permit a very comfortable access to field devices, e.g. to device parameters, measured values, diagnostic information, status information, etc., as well as permitting the invoking of special functions, which individual DTMs make available. Frame application and DTMs form together an object-based management or configuration system for field devices. In order that the DTMs of different manufacturers correctly function in the frame application, the interfaces for frame application and for all the rest of the DTMs must be clearly defined. This interface definition is referred to with the acronym FDT. The FDT technology unifies the communication interface between the field devices and the superordinated control unit. A special feature of the FDT technology is that it functions independently of the installed communication protocol as well as of the respective software environment of both the field device and the superordinated control unit. FDT enables combining any field devices via any superordinated control units with any protocols. A known FDT frame is the already mentioned product, FieldCare, of Endress+Hauser.

From the above discussion, it is clear, that the number of DTMs, or device descriptions, is very large and that the number of DTMs, based on the continually increasing device, and fieldbus, numbers, is likewise continually increasing. Often, consequently, one also speaks of a so-called DTM library. The effort, which must be expended for installation of drivers for the communication hardware, communication DTMs, field device DTMs and the software for the frame application, or the FDT servicing software, is very high.

SUMMARY OF THE INVENTION

An object of the invention is to reduce the installation effort for the installation of device objects.

The object is achieved by the features that: a communication hardware is provided, having a first communication link to the control unit and a second communication link to the fieldbus, wherein there is associated with the communication hardware a memory element, in which the device objects, a driver for the communication hardware and a frame application for the device objects are stored, and wherein the communication hardware is so embodied, that, upon coupling of the communication hardware to the control unit via the first communication link, the frame application is startable, or is started via the operating system of the control unit and the driver for the communication hardware is installed, so that operating personnel can service the associated field devices via the device objects stored in the memory element and the fieldbus. The invention enables that field devices can be serviced, without large installation effort, very rapidly, for example, via any PC or any laptop. The terminology, "servicing the field devices" means, such as already stated, especially the configuring and parametering of the field devices.

The communication hardware and bulk memory are embodied, preferably, as a USB device.

In an advantageous, further development of the apparatus of the invention, the memory element is a non-volatile, bulk memory, or a flash memory. Preferably used in connection with the invention is a USB, bulk memory, or a USB, flash memory or a hard disk. In the case of a USB, bulk memory, such is a USB device with built-in memory element, e.g. a flash memory element.

Preferably, the communication hardware includes a modem, especially a HART modem or a Profibus modem. In a preferred embodiment, the communication modem and the memory element are connected, respectively, via a third and a fourth communication link to a node point having at least three ports.

Furthermore, an advantageous, additional development of the apparatus of the invention provides that the communication on the fieldbus occurs via one of the usual fieldbus protocols. In the field of process automation, such is, especially, the Profibus protocol, the Foundation Fieldbus protocol or the HART protocol.

As already earlier mentioned, the control unit is a control system, or a control unit, such as, for example, a PLC (thus, a programmable logic controller). Viewed as especially advantageous is when the control unit is integrated into a PC, or into a laptop.

Device objects, such as e.g. the DTM library, the driver for the communication hardware and the frame application, are not static, but, instead, highly dynamic. In order to assure, that always also the current software version is available, according to a preferred embodiment of the apparatus of the invention, it is provided, that the communication hardware has an Internet connection. Furthermore, an update manager is provided, which downloads, via the Internet connection, the current software version of the device objects and/or the frame application from a Web page, which makes available the current software version. The device manager stores the downloaded software in the memory element.

A form of embodiment alternative to this provides a data carrier, in which the current software version of the device objects and/or the frame application is stored. Also, here, the update manager is provided, which stores the current software version in the memory element. The update manager is a correspondingly embodied program, which automatically updates the DTM library, or the current software version of the device objects and/or the frame application.

Alternatively to the aforementioned solution with the data carrier, it is provided, that the current software version of the device objects and/or the frame application is made available per email or from the Internet. Again, the update manager stores each current software version in the memory element. Likewise, such as in the preceding case, here, a direct Internet connection is not required.

Considered advantageous in connection with the different embodiments of the present invention is when the memory element is so designed, that different software versions of the device objects and/or the frame application are storable and that a user interface is provided, which enables for an operator the selection, in each case, of a desired software version. In this way, the user has the opportunity, in each case, to activate that software version, which is required.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
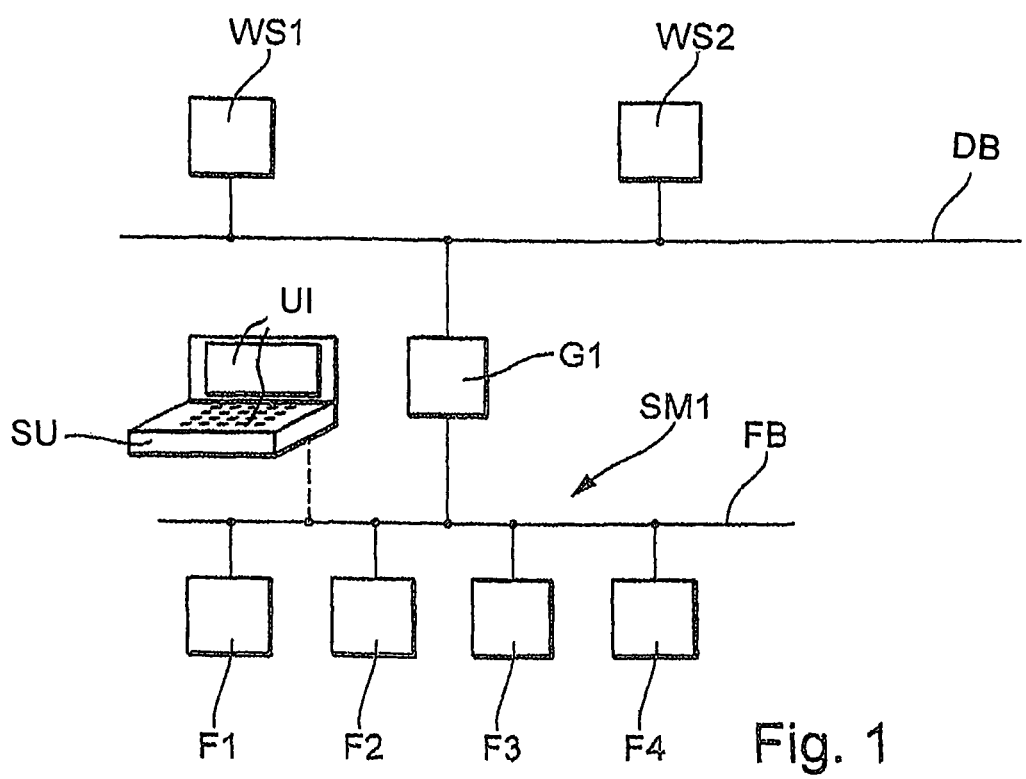
FIG. 1 a schematic drawing of a communication network of process automation.

FIG. 1 shows, schematically, a communication network KN, such as is used in process automation. Connected to a data bus DB are a number of computer units, workstations or host-computers, WS1, WS2. These computer units WS1, WS2 serve as superordinated units (control system, control unit) or as service unit SU for process visualizing, process monitoring and for engineering, however, also for servicing and monitoring of field devices F1, F2, . . . .

The data bus DB works e.g. according to the Profibus(^R) DP standard, the HME High Speed Ethernet standard of Foundation Fieldbus(^R), the HART standard or one of the known standards usable in automation technology. Via a gateway G1, which is also referred to as a linking device or segment coupler, the data bus DB is connected with a fieldbus segment SM1. The fieldbus segment SM1 is composed of a plurality of field devices F1, F2, . . . which are connected with one another via a fieldbus FB. The field devices F1, F2, . . . are sensors and/or actuators. Also connectable e.g. temporarily with the fieldbus FB can be, as indicated by the dashed line representation, a portable computer, or service unit, SU, e.g, a laptop. Via the service unit SU, operating personnel can access the individual field devices F1, F2, . . . .

Figure 2:
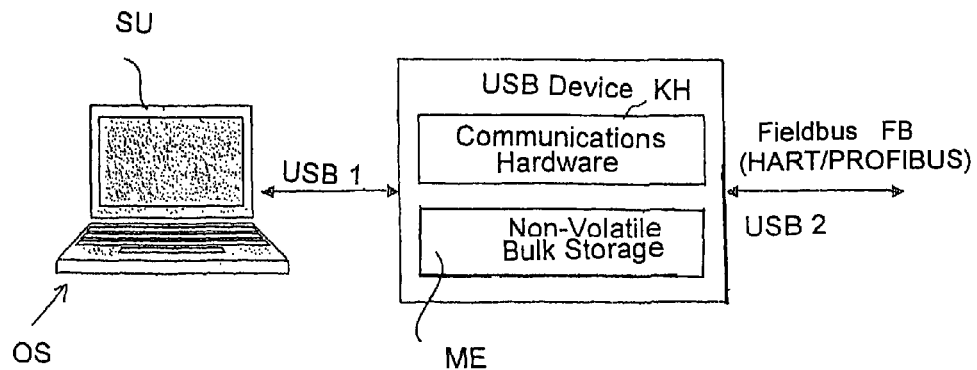
FIG. 2 a block diagram of a first form of embodiment of the apparatus of the invention.

FIG. 2 shows a block diagram of a first form of embodiment of the apparatus of the invention. The apparatus of the invention serves for integrating device objects DTM1, DTM2, . . . (DTMs) into a superordinated control unit SU for field devices F1, F2, . . . in automation technology. The device objects, DTMs, are used for servicing the field devices F1, F2, . . . . In the illustrated case, the control unit SU is a laptop. Running on the laptop SU is a predetermined, standard, operating system, e.g. of Microsoft, or a UNIX operating system. The control unit SU communicates via the fieldbus FB with the field devices F1, F2, . . . . The communication on the fieldbus occurs in accordance with one of the bus protocols used in process automation.

Figure 2A:
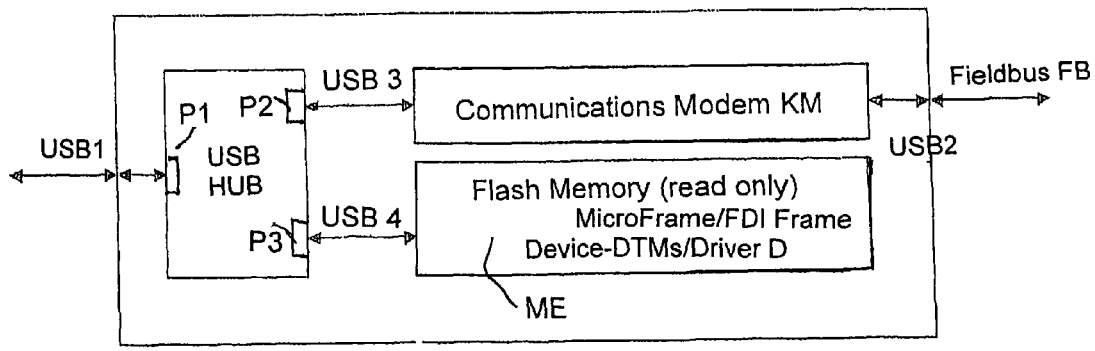
FIG. 2a a schematic drawing of the internal construction of the USB device sketched in FIG. 2.

For the purpose of communication, the laptop is associated with communication hardware KH, which has a first communication link USB1 to the laptop SU and a second communication link USB2 to the fieldbus FB. The communication hardware KH is e.g. a HART modem, such as shown in FIG. 2a, or a Profibus modem. Depending on modem, communication to the fieldbus FB occurs, then, via the HART or the Profibus protocol. Of course, the invention can be embodied also using other known protocols.

Associated with the communication hardware KH is a memory element ME, in which the device objects DTM1, DTM2, ..., a driver D for the communication hardware KH and a frame application, e.g. the FDT-FRAME for the device objects DTM1, DTM2, ..., are stored. Instead of the FDT-frame, also a so-called MicroFrame can be used. By way of example, the service protocols IPC, ISS of the firm, Endress+ Hauser, are cited here.

Preferably, the USB device is a USB plug-in with integrated bulk memory, or with integrated memory chip. The flash memory ME is a read-only memory.

The communication hardware KH is so embodied, that, upon coupling of the communication hardware KH to the control unit SU via the first communication link USB1, the frame application FDT-frame or the MicroFrame is started via the operating system OS of the control unit SU. Furthermore, the driver D for the communication hardware KH is installed, so that the operating personnel can, via the device objects DTM1, DTM2, ... stored in the memory element ME and the fieldbus FB, service the associated field devices F1, F2, .... The DTM library remains, thus, in the memory element ME. Through the connecting, here, of the USB device to the laptop SU, the memory chip ME is booted; the driver D for the hardware support is automatically installed.

FIG. 2a shows, schematically, the internal construction of the USB device sketched in FIG. 2. Here, it is shown in detail, that the communication modem KM and the memory element ME are connected, respectively, via a third communication link USB3 and a fourth communication link USB4 to a node point HUB having at least three ports P1, P2, P3. Of course it is also possible, instead of hardwired communication via USB interface, to implement wireless communication, e.g. by means of Bluetooth technology. The communication in the direction of the control unit can, thus, also be implemented wirelessly.

Figure 3:
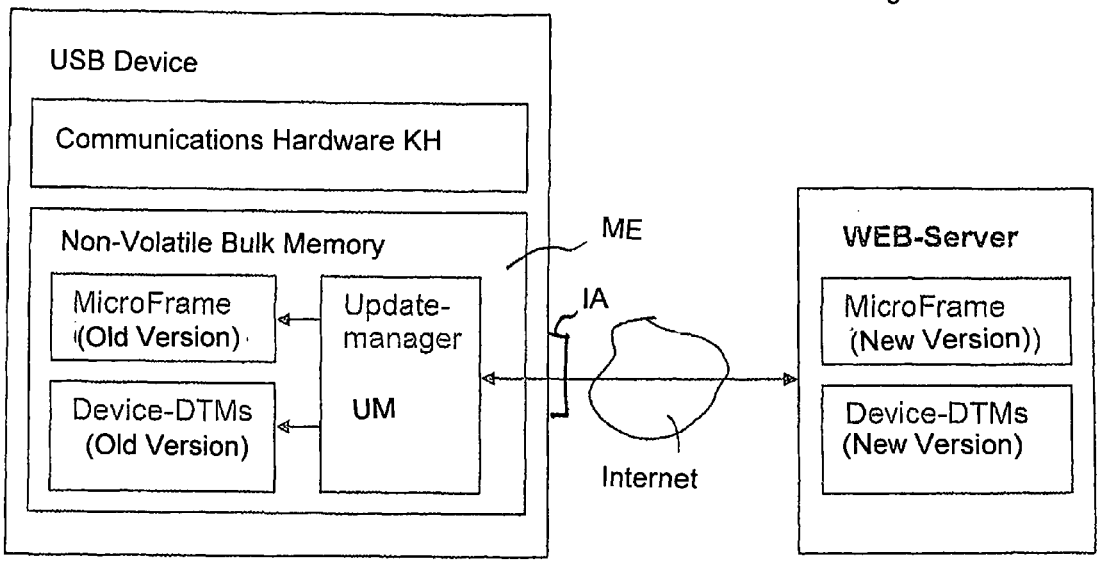
FIG. 3 a schematic drawing of a second form of embodiment of the apparatus of the invention with Internet connection.

FIG. 3 shows a schematic drawing of a second form of embodiment of the apparatus of the invention. In the case of this embodiment, the communication hardware KH has an Internet connection IC. Furthermore, an update manager UM is provided, which downloads, via the Internet connection IC, the current software version of the device objects DTM library_new version and/or the frame application FDT-frame_new version, MicroFrame_new version from a Web server, which makes available the current software version DTM library_new version, FDT-frame_new version, MicroFrame_new version. The update manager UM then stores the downloaded software in the memory element ME.

Here, thus, the operating personnel, or the user, can update the DTM library and/or the frame application automatically with the update manager UM. The update manager UM downloads the new software versions via Internet from the corresponding website and updates these on the non-volatile, bulk memory ME. As already earlier mentioned, it is possible to store different software versions in the memory element ME, so that the user can always activate the required version.

Figure 4:
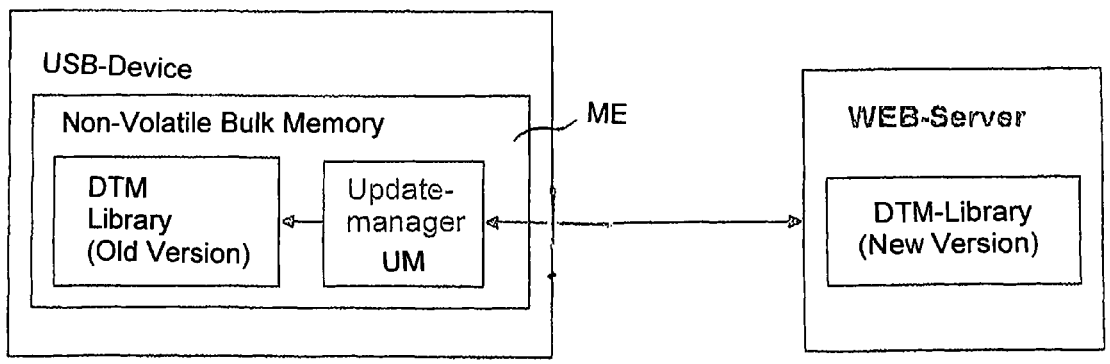
FIG. 4 a schematic drawing of a third form of embodiment of the apparatus of the invention.

Another embodiment of the apparatus of the invention is presented in FIG. 4. Here, the user obtains the current software version per email, from the Internet or on any kind of data carrier. Also here, the user starts the update manager UM and updates the software on the non-volatile, bulk memory ME. For this embodiment, the Internet connection to the USB device, or to the communication hardware KH, can be omitted. Here, also, it is possible to store different software versions in the memory element ME.

The invention claimed is:

1. An apparatus for integrating device objects into a superordinated control unit for field devices in automation technology, wherein a predetermined operating system runs on said superordinated control unit, said superordinated control unit communicates via a fieldbus with the field devices and the device objects serve for servicing the field devices, comprising:
   communication hardware, having a first communication link to said superodinated control unit and a second communication link to the fieldbus; and
   a memory element associated with said communication hardware, in which the device objects, a driver for said communication hardware and a frame application for the device objects are stored, wherein:
   said communication hardware is so embodied, that, upon coupling of said communication hardware to said superordinated control unit via said first communication link, said frame application is startable, or is started, via the operating system of said superordinated control unit and said driver for said communication hardware is installed, so that operating personnel can service the associated field devices via the device objects stored in said memory element and the fieldbus.

2. The apparatus as claimed in claim 1, wherein:
said memory element is a non-volatile, bulk memory, or a flash memory.

3. The apparatus as claimed in claim 1, wherein:
said communication hardware includes a communication modem, especially a HART modem or a Profibus modem.

4. The apparatus as claimed in claim 3, wherein:
said communication modem and said memory element are connected, respectively, via a third and a fourth communication link to a node point having at least three ports.

5. The apparatus as claimed in claim 1, wherein:
communication to the fieldbus occurs, for example, according to Profibus protocol, Foundation Fieldbus protocol or HART protocol.

6. The apparatus as claimed in claim 1, wherein:
said superordinated control unit is a control system or a control unit, comprising a PLC (programmable logic controller).

7. The apparatus as claimed in claim 6, wherein:
said PLC is integrated into a personal computer, or into a laptop.

8. The apparatus as claimed in claim 1, further comprising:
an update manager, wherein:
the communication hardware has an Internet connection; and
said update manager, which, via the Internet connection, downloads and stores in said memory element a current software version of the device objects and/or said frame application from a Web server, which makes available the current software version.

9. The apparatus as claimed in claim 1, further comprising:
a data carrier, on which a current software version of the device objects and/or the frame application is stored; and
an update manager, which stores the current software version in said memory element.

10. The apparatus as claimed in claim 1, further comprising:
- an update manager, wherein:
- a current software version of the device objects and/or said frame application is made available per email or from the Internet; and
- said update manager stores the current software version in said memory element.

11. The apparatus as claimed in claim 1, further comprising:
- a user interface, wherein:
- said memory element is so designed, that different software versions of the device objects and/or said frame application are storable; and
- said user interface, which displays the different software versions to an operator and enables selection of a desired software version.

* * * * *